United States Patent
Barguet et al.

(10) Patent No.: US 9,267,233 B2
(45) Date of Patent: Feb. 23, 2016

(54) HIGH-PERMEABILITY ELASTIC MULTISTRAND METAL CABLE

(75) Inventors: Henri Barguet, Les Martres-D'Artiere (FR); Emmanuel Clement, Saint-Vincent (FR)

(73) Assignees: COMPAGNIE GENERALE DES ESTABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 587 days.

(21) Appl. No.: 13/695,617

(22) PCT Filed: Apr. 21, 2011

(86) PCT No.: PCT/EP2011/056462
§ 371 (c)(1),
(2), (4) Date: Feb. 1, 2013

(87) PCT Pub. No.: WO2011/134900
PCT Pub. Date: Nov. 3, 2011

(65) Prior Publication Data
US 2013/0199690 A1    Aug. 8, 2013

Related U.S. Application Data

(60) Provisional application No. 61/374,531, filed on Aug. 17, 2010.

(30) Foreign Application Priority Data

Apr. 28, 2010    (FR) ...................................... 10 53248

(51) Int. Cl.
*D07B 1/06*    (2006.01)
*B60C 9/18*    (2006.01)
(Continued)

(52) U.S. Cl.
CPC ................ *D07B 1/0613* (2013.01); *B60C 9/18* (2013.01); *D02G 3/02* (2013.01); *D07B 1/062* (2013.01);
(Continued)

(58) Field of Classification Search
CPC ........ D02G 3/48; D07B 1/0613; D07B 1/062; D07B 2501/2046; B60C 9/007; B60C 2009/0092
USPC .......................................................... 57/237
See application file for complete search history.

(56) References Cited

U.S. PATENT DOCUMENTS 1,715,302 A * 5/1929 Michelin ......................... 245/1.5
3,538,702 A * 11/1970 Wolf et al. ....................... 57/218
(Continued)

FOREIGN PATENT DOCUMENTS

JP    1 085382    3/1989
JP    1 085383    3/1989
(Continued)

OTHER PUBLICATIONS

Anonymous, "High tensile strength steel cord constructions for tyres", Research Disclosure, Mason Publications, Hampshire, GB, vol. 340, No. 54, XP007118007, Aug. 1, 1992.

*Primary Examiner* — Shaun R Hurley
(74) *Attorney, Agent, or Firm* — Cozen O'Connor (57) ABSTRACT

Multistrand metal cable of 4×(4+M) construction, which can especially be used for reinforcing tire belts for industrial vehicles, formed from four elementary strands assembled in a helix with a helix pitch P3, each elementary strand consisting of a two-layer cable of 4+M construction comprising an inner layer C1 formed from four wires of diameter D1, assembled in a helix with a pitch P1, and an unsaturated outer layer C2 of M wires, M being greater than or equal to 8 and smaller than or equal to 11, of diameter D2, these being assembled in a helix with a pitch P2 around the inner layer C1, P1 being smaller than P2, the four wires of the inner layer C1 being wound in a helix in the same twist direction as the M wires of the outer layer C2, and wherein each of the diameters D1 and D2 is greater than or equal to 0.10 mm but less than or equal to 0.50 mm.

11 Claims, 3 Drawing Sheets

(51) Int. Cl.
  *D02G 3/02* (2006.01)
  *D07B 1/16* (2006.01)
  *D07B 5/12* (2006.01)
  *D07B 7/14* (2006.01)

(52) U.S. Cl.
  CPC ............... *D07B 1/0626* (2013.01); *D07B 1/165* (2013.01); *D07B 5/12* (2013.01); *D07B 7/145* (2013.01); *D07B 2201/1032* (2013.01); *D07B 2201/1068* (2013.01); *D07B 2201/2006* (2013.01); *D07B 2201/2011* (2013.01); *D07B 2201/2023* (2013.01); *D07B 2201/2029* (2013.01); *D07B 2201/2032* (2013.01); *D07B 2201/2037* (2013.01); *D07B 2201/2038* (2013.01); *D07B 2201/2046* (2013.01); *D07B 2201/2061* (2013.01); *D07B 2201/2062* (2013.01); *D07B 2201/2077* (2013.01); *D07B 2201/2081* (2013.01); *D07B 2201/2082* (2013.01); *D07B 2205/306* (2013.01); *D07B 2205/3021* (2013.01); *D07B 2205/3071* (2013.01); *D07B 2205/3085* (2013.01); *D07B 2205/3089* (2013.01); *D07B 2401/2005* (2013.01); *D07B 2401/208* (2013.01); *D07B 2501/2046* (2013.01); *D07B 2501/2076* (2013.01)

(56) References Cited

U.S. PATENT DOCUMENTS

| 5,806,296 | A  | * | 9/1998  | Kaneko et al. | 57/206  |
|-----------|----|---|---------|---------------|---------|
| 5,839,264 | A  | * | 11/1998 | Uchio         | 57/237  |
| 2007/0130905 | A1 | * | 6/2007  | Kish          | 57/237  |
| 2008/0066843 | A1 | * | 3/2008  | Alvarez et al. | 152/451 |
| 2008/0318077 | A1 | * | 12/2008 | Barguet et al. | 428/592 |

FOREIGN PATENT DOCUMENTS

| JP | 1 085384       | 3/1989  |
| JP | 11 061666      | 3/1999  |
| JP | 2000 129584    | 5/2000  |
| JP | 2006 152483    | 6/2006  |
| JP | 2006 283197    | 10/2006 |
| WO | WO 2011 000964 | 1/2011  |

* cited by examiner

HIGH-PERMEABILITY ELASTIC MULTISTRAND METAL CABLE

RELATED APPLICATIONS

This is a U.S. National Stage of application no. PCT/EP2011/056462, filed Apr. 21, 2011.

This application claims the priority of French application no. 10/53248 filed Apr. 28, 2010 and U.S. Provisional application No. 61/374,531 filed Aug. 17, 2010, the entire content of both of which are hereby incorporated by reference

FIELD OF THE INVENTION

The present invention relates to high-strength multistrand cables, which can especially be used for the reinforcement of pneumatic tires for heavy industrial vehicles, such as heavy goods vehicles or civil engineering vehicles.

The invention also relates to tires and to the reinforcements for tires, and in particular to the crown reinforcements, also called "belts", of tires, and more particularly the reinforcement of the tire belts for heavy industrial vehicles.

BACKGROUND

As is known, a radial tire comprises a tread, two inextensible beads, two sidewalls connecting the beads to the tread, a carcass reinforcement and a belt placed circumferentially between the carcass reinforcement and the tread. The belt is made up of various rubber plies (or "layers") which may or may not be reinforced by reinforcing elements such as cabled threads or monofilaments, of the metal or textile type.

The belt generally consists of several superposed belt plies, sometimes called "working" plies or "crossed" plies, the generally metallic reinforcing cables of which are placed so as to be practically parallel to one another within a ply but at an angle from one ply to another, that is to say they are inclined, whether symmetrically or not, to the median circumferential plane. These crossed plies are generally accompanied by various other auxiliary rubber plies or layers, which vary in width depending on the case and may or may not comprise metal reinforcing elements. Mention may in particular be made of what are called "protective" plies responsible for protecting the rest of the belt from external attack and especially from perforations, or else what are called "hooping" plies having metallic or non-metallic reinforcing elements oriented substantially along the circumferential direction, (so-called "zero-degree" plies), irrespective of whether they are radially outside or inside with respect to the crossed plies.

As is known, such a tire belt must meet various, often contradictory, requirements, in particular:

it must be as rigid as possible at low deformation, as it contributes substantially to stiffening the tire crown;

it must have as low a hysteresis as possible, in order, on the one hand, to minimize heating of the inner region of the crown during travel and, on the other hand, to reduce the rolling resistance of the tire, this being synonymous with fuel economy; and finally, it must have a high endurance, in particular with respect to the phenomenon of separation, i.e. cracking of the ends of the crossed plies in the shoulder region of the tire, known as "cleavage", which in particular requires metal cables that reinforce the belt plies to have a high compressive fatigue strength, even in a relatively corrosive atmosphere.

The requirement of high endurance is particularly important in the case of tires for industrial vehicles, such as heavy goods vehicles or civil engineering machinery, which are designed in particular to be able to be retreaded one or more times when their treads reach a critical stage of wear after prolonged travel or usage.

Furthermore, the tire belts for industrial vehicles comprise, as is known, one or more "protective" crown plies or layers located beneath the tread and covering the working crown ply or plies, which are designed to protect the rest of the belt from external attack, tearing or other perforations.

These protective plies or layers must be sufficiently flexible and deformable so that, on the one hand, they best follow the shape of the obstacle on which the belt bears during travel and, on the other hand, they prevent the penetration of foreign bodies radially thereinto. As is known, to meet such criteria requires the use, in these protective layers, of reinforcing elements or cables having a high elasticity and a high fracture energy.

For the reinforcement of the protective crown plies, the hooping plies and the working crown plies of tires for heavy industrial vehicles, it is general practice at the present time to use multistrand cables, especially multistrand cables having a single layer (i.e. with no central core of one or more other strands) of K×(L+M) construction, the K elementary strands of which are assembled, wound simultaneously in a helix as a single layer, with an assembly pitch PK. Each of the K two-layer elementary strands, of L+M construction, itself comprises a plurality of steel wires also wound together in a helix as two concentric layers (an inner layer of L wires and an outer layer of M wires).

Such multistrand cables having a K×(L+M) construction, especially of the type having a high elongation, are well known and have been described in many patent documents, in particular for reinforcing protective crown plies of tires for industrial vehicles such as heavy goods or civil engineering vehicles (see for example EP 1000074, U.S. Pat. No. 6,475,636, U.S. Pat. No. 7,458,200, WO 2004/003287 or US 2005/0183808, WO 2004/033789 or U.S. Pat. No. 7,089,726 or else RD (Research Disclosure) No 33877, June 1992, 488-492.

As is well known to those skilled in the art, these multistrand cables must be impregnated as much as possible by the rubber in the tire belts that they reinforce so that said rubber penetrates as much as possible into the spaces between the wires constituting the strands. If this penetration is insufficient, empty channels then remain along the strands, and corrosive agents, for example water, capable of penetrating the tires, for example as a result of the tire belt being cut or otherwise attacked, travel along these channels through said belt. The presence of this moisture plays an important role, causing corrosion and accelerating the fatigue process (so-called "fatigue-corrosion" effect) compared to use in a dry atmosphere.

All these fatigue effects, generally grouped together under the generic term "fatigue-fretting corrosion", are the cause of progressive degeneration of the mechanical properties of the cables and strands and may, under the most severe running conditions, affect the lifetime of the tires.

SUMMARY OF THE INVENTION

One of the objectives of the present invention is to provide a multistrand steel cable having a high rupture strength and good elasticity, while still being easily penetrated by a rubber compound.

This objective is achieved by a multistrand metal cable of 4×(4+M) construction, which can especially be used for reinforcing tire belts for industrial vehicles, formed from four elementary strands assembled in a helix with a helix pitch P3, each elementary strand consisting of a two-layer cable of 4+M construction comprising an inner layer C1 formed from four wires of diameter D1, assembled in a helix with a pitch P1, and an unsaturated outer layer C2 of M wires, M being greater than or equal to 8 and smaller than or equal to 11, of diameter D2, these being assembled in a helix with a pitch P2 around the inner layer C1, P1 being smaller than P2, the inner layer C1 and the outer layer C2 being wound in the same direction, and in which each of the diameters D1 and D2 is greater than or equal to 0.10 mm but less than or equal to 0.50 mm.

The outer layer of each elementary strand is "unsaturated" in that the number M of wires of said outer layer C2 of the strand is smaller than the maximum number MMAX of wires of diameter D2 that can be wound in a helix, as a single layer, around the inner layer C1 of the strand.

Such multistrand cables can be used for reinforcing rubber articles or semi-finished products, for example plies, hoses, belts, conveyor belts and tires.

The multistrand cable according to an embodiment of the invention is particularly suitable for use as reinforcing element for a belt of a tire designed for industrial vehicles, such as "heavy" vehicles, i.e. underground trains, buses, road transport vehicles (lorries, tractors, trailers), off-road vehicles, and agricultural or civil engineering machinery and other transport or handling vehicles.

Another aspect of the invention relates to these rubber articles or semi-finished products themselves when they are reinforced with a multistrand cable according to an embodiment of the invention, particularly tires designed especially for industrial vehicles.

The invention and its advantages will be readily understood in the light of the description and the embodiments that follow, together with FIGS. 1 to 6 relating to these embodiments.

MEASUREMENTS AND TESTS

M1—Dynamometric Measurements

As regards the metal wires and cables, the measurements of the rupture force denoted by FM (maximum load in N), the rupture strength denoted by RM (in MPa) and the elongation at break denoted by AT (total elongation in %) are carried out in tension according to the standard ISO 6892 (1984).

M2—Air Permeability Test

This test enables the longitudinal air permeability of the tested metal cables to be determined by measuring the volume of air crossing through a sample under constant pressure over a given time. The principle of such a test, well known to those skilled in the art, is to demonstrate the effectiveness of the treatment of a cable in order to make it impermeable to air. The test has been described for example in the standard ASTM D2692-98.

The test is carried out here either on multistrand cables as produced or on cables extracted from tires or from the rubber plies that these multistrand cables reinforce, and therefore already coated with cured rubber.

In the first case (multistrand cables as produced), the metal cables must be coated beforehand from the outside with a rubber coating compound. To do this, a series of ten metal cables arranged so as to be in parallel (with an inter-strand distance of 20 mm) is placed between two skims (two rectangles measuring 80×200 mm) of a cured rubber composition, each skim having a thickness of 5.0 mm. The whole assembly is then clamped in a mould, each of the strands being maintained under sufficient tension (for example 3 daN) to ensure that it remains straight when being placed in the mould, using clamping modules. Then the assembly is vulcanized (cured) over about ten to twelve hours at a temperature of about 120° C. and under a pressure of 15 bar (rectangular piston measuring 80×200 mm), after which the assembly is unmoulded and cut up into 10 samples of metal cables thus coated, in the form of parallelepipeds measuring 10 mm×10 mm×LT for characterization, LT being a predetermined length of metal cable.

A conventional tire rubber composition is used as rubber coating compound, said composition being based on natural (peptized) rubber and N330 carbon black (50 phr) and also containing the following usual additives: sulphur (7 phr), sulphonamide accelerator (1 phr), ZnO (8 phr), stearic acid (0.7 phr), antioxidant (1.5 phr) and cobalt naphthenate (1.5 phr). Its Mooney viscosity at 100° C. is equal to about 70, and its scorch time (T5) at 130° C. is equal to about 10 min.

For the Mooney viscosity measurement, an oscillating viscosity meter as described in the French standard T43-005 (1991) is used according to the following principle: the composition in the green or uncured state (i.e. before curing) is moulded in a cylindrical enclosure heated to 100° C. After preheating for one minute, the rotor rotates within the sample at 2 rpm and the useful torque for sustaining this movement is measured after 4 minutes of rotation. The Mooney viscosity (ML 1+4) is expressed in Mooney units (MUs, with 1 MU=0.83 Nm).

The scorch time is measured at 130° C. in accordance with the NF-T43-005 standard. The change in viscosity index as a function of time is used to determine the scorch time of a rubber composition, assessed in accordance with the aforementioned standard by the parameter T5, expressed in minutes, and defined as being the time needed to increase the viscosity index (expressed in Mooney units) by 5 units above the minimum value measured for this index.

The test is carried out on a predetermined length LT of metal cable (for example equal to P3 or 6 cm), thus coated with its surrounding rubber composition (or rubber coating compound), in the following manner: air under a pressure of 1 bar is injected into the inlet of the strand and the volume of air leaving it is measured using a flow meter (calibrated for example from 0 to 500 cm³/min). During the measurement, the strand sample is immobilized in a compressed seal (for example a rubber or dense foam seal) in such a way that only the amount of air passing through the metal cable from one end to the other, along its longitudinal axis, is measured. The sealing capability of the seal is checked beforehand using a solid rubber sample, that is to say one without a cable.

The measured average air flow rate (the average over the 10 samples) is lower the higher the longitudinal impermeability of the metal cable. Since the measurement is accurate to ±0.2 cm$^3$/min, measured values of 0.2 cm$^3$/min or less are considered to be zero—they correspond to a strand that can be considered to be completely airtight along its axis (i.e. along its longitudinal direction).

In the air permeability test, an "airtight" metal cable is characterized by an average air flow rate of 0.2 cm$^3$/min or less, whereas a "practically airtight" metal cable is characterized by an average air flow rate of less than 2 cm$^3$/min, preferably less than 1 cm$^3$/min.

DETAILED DESCRIPTION OF THE DRAWINGS

In the present description, unless expressly indicated otherwise, all the percentages (%) indicated are percentages by weight.

Moreover, any interval of values denoted by the expression "between a and b" represents the range of values going from more than a to less than b (i.e. the limits a and b are excluded) whereas any interval of values denoted by the expression "from a to b" means a range of values going from a up to b (i.e. the strict limits a and b are included).

The term "metal cable" is understood by definition in the present application to mean a cable formed from wires consisting predominantly (i.e. more than 50% by number of these wires) or entirely (100% of the wires) of a metallic material. The wires are preferably made of steel, more preferably carbon steel. However, it is of course possible to use other steels, for example stainless steel, or other alloys.

When a carbon steel is used, its carbon content (percentage by weight of steel) is preferably between 0.2% and 1.2%, especially between 0.5% and 1.1%. These contents represent a good compromise between the mechanical properties required of the tire and the feasibility of the wires. It should be noted that a carbon content between 0.5% and 0.6% makes such steels finally less expensive as they are easier to draw. Another advantageous embodiment of the invention may also consist, depending on the intended applications, in the use of steels having a low carbon content, for example between 0.2% and 0.5%, in particular because of a lower cost and greater wire drawability.

The metal or steel used, whether in particular a carbon steel or a stainless steel, may itself be coated with a metal layer that improves, for example, the processing properties of the metal cable and/or its constituent components, or the usage properties of the cable and/or of the tire themselves, such as the adhesion, corrosion resistance or aging resistance properties. According to a preferred embodiment, the steel used is coated with a layer of brass (Zn—Cu alloy) or of zinc. It will be recalled that, during the wire manufacturing process, the brass or zinc coating makes wire drawing easier and makes the wire bond better to the rubber. However, the wires could be coated with a thin metal layer other than a brass or zinc layer, and/or with organic coupling agents possibly based on silanes, for example having the function of improving the corrosion resistance of these wires and/or their adhesion to rubber, for example a thin layer of Co, Ni, Al, or an alloy of two or more of the metals Cu, Zn, Al, Ni, Co, Sn.

The strands used in the multistrand cable of the invention are preferably made of carbon steel and have a rupture strength (RM) of preferably greater than 2500 MPa, more preferably greater than 2800 MPa. The total elongation at break (denoted by AT) of each constituent strand of the cable according to an embodiment of the invention, which is the sum of its structural elastic and plastic elongations, is preferably greater than 2.0%, more preferably at least 2.5%.

Multistrand Cord According to the Invention

I—Structure

The multistrand metal cable of the invention has a 4×(4+M) construction. It comprises four elementary strands assembled in a helix with a helix pitch P3, each elementary strand consisting of a two-layer cable of 4+M construction comprising an inner layer C1 formed from four wires of diameter D1, assembled in a helix with a pitch P1, and an unsaturated outer layer C2 of M wires, M being greater than or equal to 8 and smaller than or equal to 11, of diameter D2, these being assembled in a helix with a pitch P2 around the inner layer C1, P1 being smaller than P2, the four wires of the inner layer C1 being wound in a helix in the same twist direction as the M wires of the outer layer C2, the M wires of the outer layer C2 being wound in the same direction as said four elementary strands assembled in a helix with a helix pitch P3. Each of the diameters D1 and D2 is greater than or equal to 0.10 mm but less than or equal to 0.50 mm.

It will be recalled here, as is known, that the pitch P represents the length measured parallel to the axis of the outer strand or of the multistrand cable, after which a wire or an outer strand having respectively this pitch makes one complete revolution about said axis.

The outer layer of each elementary strand is "unsaturated" in that the number M of wires of said outer layer C2 of the strand is smaller than the maximum number MMAX of wires of diameter D2 that can be wound in a helix, as a single layer, around the inner layer C1 of the strand.

The fact of providing an outer layer C2 of the strand having a smaller number of wires than the maximum number of wires of diameter D2 that can be wound in a helix, as a single layer, around the inner layer C1 of the strand has a consequence that the average distance between the wires of the outer layer C2 of the strand increases, thereby making it easier for the rubber compound to penetrate into the core of the strands.

According to one particular embodiment, the number M of wires of said outer layer C2 of the strand is less by 1 than the maximum number MMAX of wires of diameter D2 that can be wound in a helix, as a single layer, around the inner layer C1 of the strand (M=MMAX−1). This configuration provides an excellent compromise between the mechanical strength of the cable and its penetrability.

According to one advantageous embodiment, the number M of wires of said outer layer C2 of the strand is chosen such that the average minimum distance between the wires of diameter D2 wound in a helix around the inner layer C1 of the strand, consisting of four wires of diameter D1, is greater than or equal to D2/X where X=π(DC1+D2)/DC, DC1 being the diameter of the inner layer C1 of the strand, which is itself dependent on the diameter D1. A person skilled in the art will understand that MMAX corresponds to the integer part of X. Preferably, the average minimum distance between the wires of diameter D2 wound in a helix around the inner layer C1 of the strand is greater than or equal to D2/MMAX and more preferably still greater than or equal to 0.05 mm.

For an optimized compromise between strength, feasibility, rigidity and endurance in compression of the cable, it is preferable that, in each elementary strand, each of the diameters D1 and D2 is greater than or equal to 0.15 mm but less than or equal to 0.35 mm.

According to one advantageous embodiment, in each elementary strand, the pitch P1 is greater than or equal to 3 mm but less than the pitch P2, the pitch P2 being less than or equal to 20 mm (3 mm≤P1<P2≤20 mm). More preferably, the pitch P2 is less than or equal to 15 mm (3 mm≤P1<P2≤15 mm) and even more preferably less than or equal to 10 mm (3 mm≤P1<P2≤10 mm).

Preferably, in each elementary strand, P2 is greater than or equal to 5 mm but less than or equal to 10 mm. The consequence of choosing these preferred values for the pitches P1 and P2 is that the wires of the outer layer C2 remain on the surface of the cylindrical envelope formed by the wires of the inner layer C1. This increases the unsaturation of the outer layer C2 and consequently the penetrability of the strand.

Preferably, P3 is greater than or equal to 7 mm but less than or equal to 25 mm, and even more preferably greater than or equal to 10 mm but less than or equal to 20 mm. The consequence of these preferred values for the pitches P3, P2 and P1 and the choice of the same direction of twisting result in an addition of twists, which is advantageous.

In the strands of the cables according to the invention, the wires of the two layers may have the same diameter (i.e. D1=D2), which in particular simplifies the manufacture of the strands and reduces their cost, or different diameters (i.e. D1≠D2) from one layer C1 to the other C2, provided that the number M of wires of said outer layer C2 of the strand is smaller than the maximum number MMAX of wires of diameter D2 that can be wound in a helix, as a single layer, around the inner layer C1 of the strand. To give an example, when M=8, D1 may be equal to D2 or different from D2. However, when M=11, D1 is necessarily greater than D2 as otherwise M is not smaller than MMAX any more.

Preferably, in each elementary strand, the ratio D1/D2 of the diameters D1 and D2 is greater than or equal to 0.5 but less than or equal to 1.5, and even more preferably this ratio D1/D2 is greater than or equal to 0.7 but less than or equal to 1.3.

FIGS. 1 to 4 show schematically cables according to embodiments of the invention.

Figure 1:
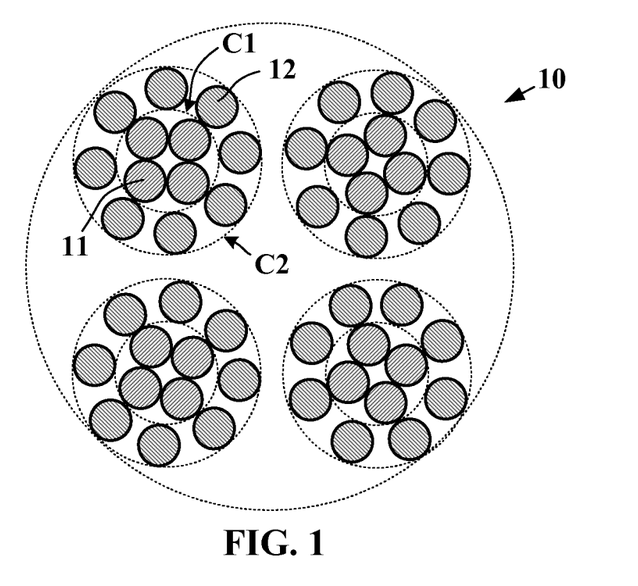
FIG. 1 shows schematically, in cross section perpendicular to the axis of the cable, an example of a multistrand cable according to an embodiment of the invention, of 4×(4+8) cylindrical construction.

FIG. 1 shows schematically, in cross section perpendicular to the axis of the cable (assumed to be straight and at rest), an example of a multistrand cable 10 according to an embodiment of the invention, of 4×(4+8) construction. In this example, the diameter D1 of the wires 11 of the inner layer C1 is the same as the diameter D2 of the wires 12 of the outer layer C2. Given the number of wires 11 of the inner layer C1, the value of MMAX is equal to 10. The average minimum distance between the wires 12 of the outer layer C2 is greater than or equal to D2/8 and corresponds to one of the criteria as defined above for the outer layer C2 to be unsaturated.

Figure 2:
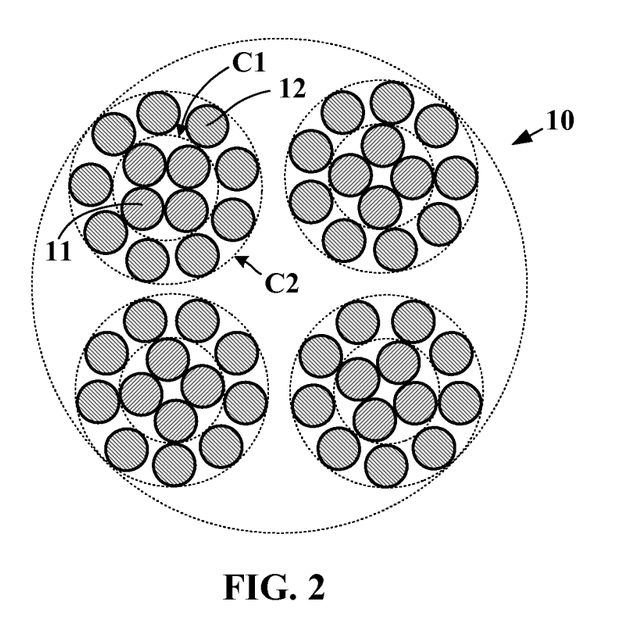
FIG. 2 shows schematically, in cross section perpendicular to the axis of the cable, an example of a multistrand cable according to an embodiment of the invention, of 4×(4+9) cylindrical construction.

FIG. 2 shows schematically a second example of a multistrand cable 10 according to an embodiment of the invention, of 4×(4+9) construction. The diameter D1 of the wires 11 of the inner layer C1 is the same as the diameter D2 of the wires 12 of the outer layer C2. Given the number of wires 11 of the inner layer C1, the value MMAX is equal to 10. The average minimum distance between the wires 12 of the outer layer C2 is greater than or equal to D2/9 and corresponds to one of the criteria as defined above for the outer layer C2 to be unsaturated.

Figure 3:
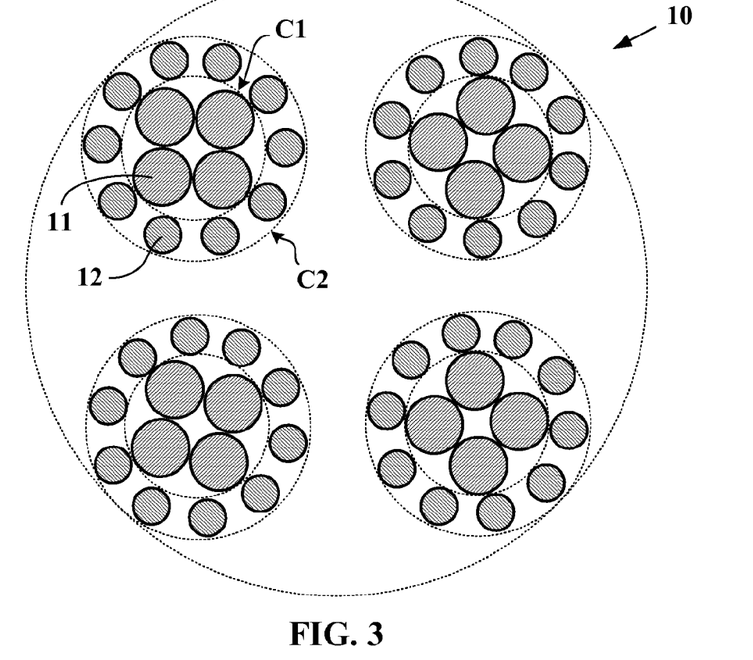
FIG. 3 shows schematically, in cross section perpendicular to the axis of the cable, an example of a multistrand cable according to an embodiment of the invention, of 4×(4+10) cylindrical construction.

FIG. 3 shows schematically a third example of a multistrand cable 10 according to an embodiment of the invention, of 4×(4+10) construction. Here the diameter D1 of the wires 11 of the inner layer C1 is greater than the diameter D2 of the wires 12 of the outer layer C2. The average minimum distance between the wires 12 of the outer layer C2 is greater than or equal to D2/10.

Figure 4:
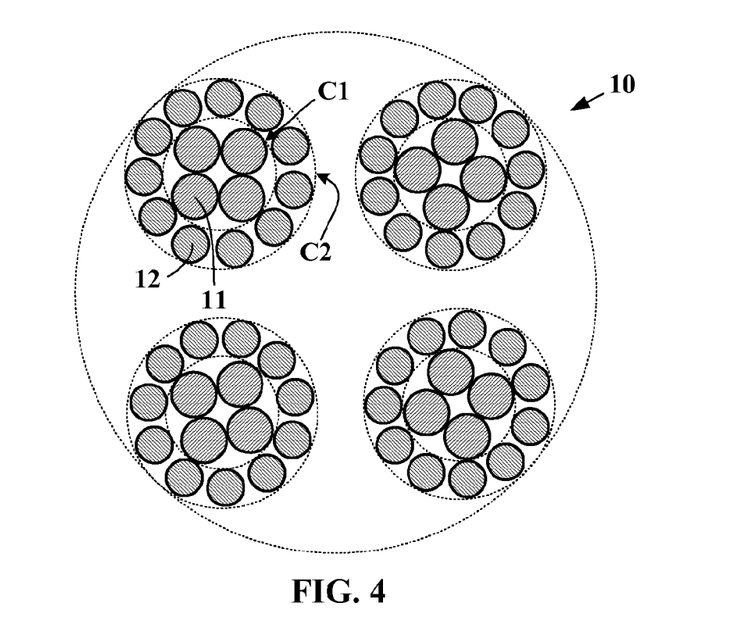
FIG. 4 shows schematically, in cross section perpendicular to the axis of the cable, an example of a multistrand cable according to an embodiment of the invention, of 4×(4+11) cylindrical construction.

FIG. 4 shows schematically a final example of a multistrand cable 10 according to an embodiment of the invention, of 4×(4+11) construction. The diameter D1 of the wires 11 of the inner layer C1 is greater than the diameter D2 of the wires 12 of the outer layer C2. The average minimum distance between the wires 12 of the outer layer C2 is greater than or equal to D2/11.

II—Manufacture

Manufacture of the Elementary Strands

The elementary strands of 4+M construction described above are manufactured according to known processes comprising the following steps, carried out preferably in line and continuously:

firstly, an assembly step, in which the four core wires are twisted or cabled in order to form the inner layer C1 of the strand at an assembly point; optionally, downstream of said point for assembling the four core wires, a coating step in which the inner layer C1 of the strand is coated with the uncured (i.e. uncrosslinked) filling rubber compound;

followed by an assembly step in which the M wires of the outer layer C2 of the strand are twisted or cabled around the inner layer C1 of the strand; and preferably, a final step of equalizing torsions, in particular during the coating operation.

It will be recalled here that there are two possible techniques for assembling metal wires:

either by cabling: in such a case, the wires undergo no torsion about their own axis, because of a synchronous rotation before and after the assembly point;

or by twisting: in such a case, the wires undergo both a collective twist and an individual twist about their own axis, thereby generating an untwisting torque on each of the wires.

One preferred feature of the above process is to use, when assembling both the inner layer (C1) of the strand and the outer layer C2 of the strand, a twisting step.

During the first step, the four core wires are twisted together (S or Z twist direction) in order to form the inner layer C1 of the strand, in a manner known per se; the wires are delivered by supply means, such as spools, a separating grid, whether or not coupled to an assembling guide, suitable for making the core wires converge at a common twisting point (or assembly point).

The inner layer C1 of the strand thus formed may then be coated with uncured filling rubber compound, supplied by an extrusion screw at a suitable temperature. The filling rubber compound may thus be delivered to a single fixed small point, by means of a single extrusion head without having to individually coat the wires upstream of the assembly operations, before formation of the inner layer as described in the prior art.

This process has the considerable advantage of not slowing down the conventional assembly process. It thus makes it possible for the complete operation—initial twisting, rubber coating and final twisting—to be carried out in line and in a single step whatever the type of cable produced (compact cable or cylindrically layered cable), all at high speed.

Lastly, the final assembly operation is carried out, preferably by twisting (in the same direction S or Z as in the case of the inner layer) the M wires of the outer layer C2 of the strand around the thus-coated inner layer C1 of the strand.

The optional following step consists in making the cable pass through twist equalizing means. The term "twist equalizing" is understood here to mean, as is well known to those skilled in the art, the cancelling-out of the residual torsional moments (or of elastic return moments due to untwisting)

acting upon each thread of the strand, both in the inner layer C1 of the strand and in the outer layer C2 of the strand.

After this final equalizing step, the manufacture of the outer strand is complete. This strand is wound up on one or more receiving spools, for storage, before the subsequent operation of cabling the elementary strands in order to obtain the multistrand cable of the invention.

An assembling/rubber-coating device that can be used for implementing the process described above is a device comprising, from the upstream end to the downstream end, along the direction of advance of a strand being formed:

means for supplying the four core wires;

means for assembling the four core wires by twisting or cabling them in order to form the inner layer C1 of the strand;

optionally, means for coating the inner layer C1 of the stand;

means for assembling the M outer wires by twisting or cabling them around the inner layer C1 of the thus-coated strand, to form the outer layer C2 of the strand; and, finally, optional means for equalizing torsions.

Figure 5:
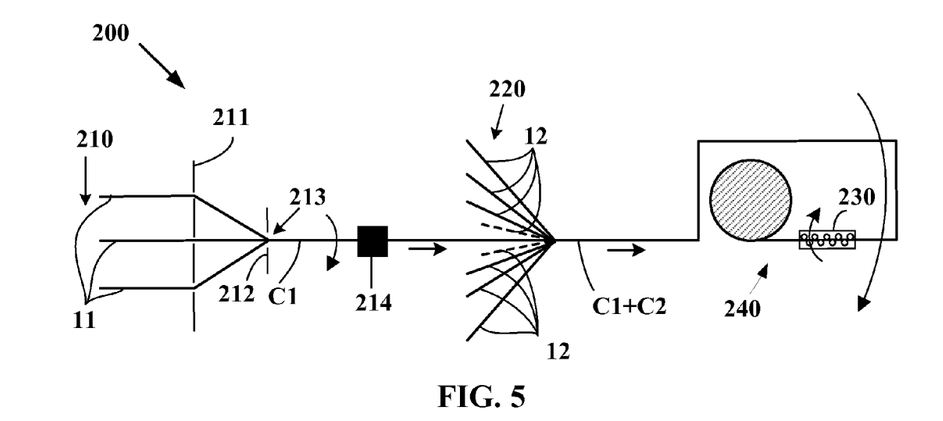
FIG. 5 shows schematically an example of the twisting and in-situ rubber coating installation that can be used to produce strands for the manufacture of the multistrand cable of the invention.

FIG. 5 shows an example of a twisting assembly device 200 having a rotating feed and a rotating receiver, which can be used for the manufacture of a strand of the cylindrical layered type (wherein the pitch P1 of the layer C1 differs from the pitch P2 of the layer C2), for example of 4+8 construction as illustrated in FIG. 1. In this device 200, feed means 210 deliver four core wires 11 (only three of which are depicted) through a distributing grid 211 (an axis symmetric distributor), which may or may not be coupled to an assembling guide 212, beyond which the four wires 11 converge to an assembly point or twisting point 213, in order to form the inner layer (C1) of the strand.

Once formed, the inner layer C1 can then pass through an optional coating zone consisting, for example, of a single extrusion head 214 through which the inner layer is to pass. The distance between the point of convergence 213 and the coating point 214 is for example between 50 cm and 1 m. The N wires 12 of the outer layer (C2) of the strand, for example eight wires, delivered by feed means 220, are then assembled by being twisted around the optionally rubber-coated inner layer (C1) of the strand progressing along the direction indicated by the arrow. The strand C1+C2 thus formed is finally collected on a rotating receiver 240 after having passed through the means 230 for equalizing torsions consisting for example of a straightener or twister-straightener.

Manufacture of the Multistrand Cord

The process for manufacturing the multistrand cable of the invention is carried out, in a manner well known to those skilled in the art, by cabling or twisting the previously obtained elementary strands using cabling or twisting machines designed for assembling the strands.

According to a preferred method of implementation, the twisting process used comprises the following known steps (see for example the aforementioned patent application WO 2004/003287) for obtaining a preferential multistrand cable of the HE (high elongation) type:

the four elementary strands are wound together in a helix as a single layer, with a given transient twist pitch;

an overtwist is applied so as to reduce this transient pitch, that is to say to increase the helix angle of said layer and, as a consequence, the helix curvature of the latter; and the cable obtained is stabilized by untwisting it, so as to obtain a zero residual torque.

III—Use of the Cord

The multistrand cable of the invention may be used for reinforcing articles other than tires, for example hoses, belts, conveyor belts; advantageously, it could also be used for parts of a tire other than its crown reinforcement, especially for the carcass reinforcement of tires for industrial vehicles.

However, as explained in the introduction of the present document, the cable of the invention is particularly suitable as a tire crown reinforcement for large industrial vehicles, such as civil engineering vehicles, especially of the mining type.

Figure 6:
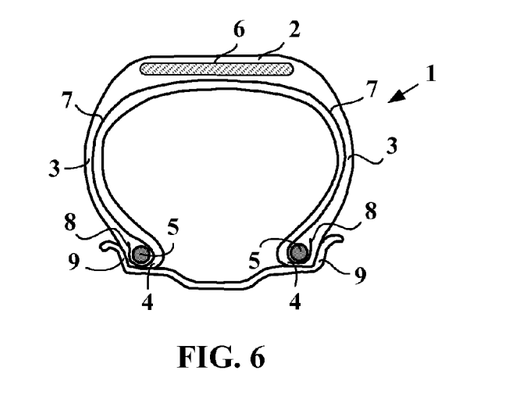
FIG. 6 shows schematically, in radial section, a tire for an industrial vehicle with a radial carcass reinforcement.

To give an example, FIG. 6 shows very schematically a radial cross section through a tire with a metal crown reinforcement, which may or may not be in accordance with the invention, in this general representation.

This tire 1 comprises a crown 2 reinforced by a crown reinforcement or belt 6, two sidewalls 3 and two beads 4, each of these beads 4 being reinforced by a bead wire 5. The crown 2 is surmounted by a tread. A carcass reinforcement 7 is wound around the two bead wires 5 in each bead 4, the turn-up 8 of this reinforcement 7 oriented for example towards the outside of the tire 1, which is shown here mounted on its rim 9. As is known per se, the carcass reinforcement 7 is formed by at least one ply reinforced by "radial" cables, that is to say these cables are practically parallel to one another and extend from one bead to the other so as to make an angle of between 80° and 90° with the median circumferential plane (i.e. the plane perpendicular to the rotation axis of the tire, which plane is located half-way between the two beads 4 and passes through the axial middle of the crown reinforcement 6).

The tire according to an embodiment of the invention is characterized in that its belt 6 comprises at least, as reinforcement for at least one of the belt plies, a multistrand cable according to an embodiment of the invention. In this belt 6 shown schematically in a very simple manner in FIG. 7, it will be understood that the multistrand cables of the invention may for example reinforce some or all of what are called the "working" belt plies. Of course, this tire 1 also includes, as is known, an inner layer of rubber compound or elastomer (usually called "inner liner") that defines the radially inner face of the tire and is suitable for protecting the carcass ply from the diffusion of air coming from the space inside the tire.

IV—Embodiments

The following tests demonstrate the capability of the invention to provide multistrand cables of high rupture strength and good elasticity, while still being easily penetrable by rubber compound.

Nature and Properties of the Wires and Cords Used

In the following tests, two-layered strands of 4+9 construction as shown schematically in FIG. 1, formed from fine brass-coated carbon steel wires, were used as elementary strands.

The carbon steel wires were prepared in a known manner, for example from wire stock (5 to 6 mm in diameter) which was firstly work-hardened, by rolling and/or drawing, down to an intermediate diameter close to 1 mm. The steel used for the cable according to an embodiment of the invention was, for example, an NT (normal tensile) carbon steel, the carbon content of which being about 0.7% and the balance consisting of iron, manganese, silicon and usual inevitable impurities due to the steel manufacturing process.

The wires of intermediate diameter underwent a degreasing and/or pickling treatment before their subsequent conversion. After a brass coating had been deposited on these intermediate wires, what is called a "final" work-hardening operation was carried out on each wire (i.e. after the final patenting heat treatment), by cold-drawing it in a wet medium with a drawing lubricant for example in the form of an aqueous emulsion or dispersion.

The steel wires thus drawn have the following diameters and mechanical properties:

TABLE 1

| Steel | φ (mm) | FM (N) | RM (MPa) |
|---|---|---|---|
| NT | 0.26 | 145 | 2900 |

These wires were then assembled in the form of strands and then in the form of cables, the mechanical properties of which are given in Table 2:

TABLE 2

| Cord | Wire grade | P1 (mm) | P2 (mm) | P3 (mm) | FM (daN) | RM (MPa) |
|---|---|---|---|---|---|---|
| "R" | 4 × (3 + 9) AS = 3.8% | NT | 5.1 | 7.5 | 15 | 5900 | 2190 |
| "A" | 4 × (4 + 8) AS = 3.8% | NT | 5.1 | 7.5 | 15 | 6280 | 2120 |

The letter "R" corresponds to a reference cable. To manufacture these cables, twisting assembly means were used. The term "AS" denotes here the "structural elongation" of the cable. The way in which this term is measured is well known to those skilled in the art and described, for example, in the document US 2009/294009 (cf. FIG. 1 and the description relating thereto).

Results of the Tests

Table 3 shows the results of the air permeability tests. The permeability is characterized both by an average air flow rate (an average over 10 measurements) and by NPO, i.e. the number of measurements corresponding to a zero air flow rate, NPO being determined on the test sample.

TABLE 3

| Letter | Unit | "R" | "A" |
|---|---|---|---|
| Average flow rate | cm³/min | 100 | 20-50 |
| NP0 [test sample] | % | 0 | 20 |

The improved penetration performance of cable "A" according to an embodiment of the invention is demonstrated both by the reduced average flow rate and by the significant increase in the number of cases in which this is considered to be zero, by comparison with a reference elastic cable "R" that does not meet all the claimed requirements.

The invention claimed is:

1. A multistrand metal cable of 4×(4+M) construction, formed from four elementary strands assembled in a helix with a helix pitch P3, each elementary strand consisting of a two-layer cable of L+M construction comprising an inner layer C1 formed from four wires of diameter D1, assembled in a helix with a pitch P1, and an unsaturated outer layer C2 of M wires, M being greater than or equal to 8 and smaller than or equal to 11, of diameter D2, these being assembled in a helix with a pitch P2 around the inner layer C1, P1 being smaller than P2, the four wires of the inner layer C1 being wound in a helix in the same twist direction as the M wires of the outer layer C2, the M wires of the outer layer C2 being wound in the same direction as said four elementary strands, and wherein each of the diameters D1 and D2 is greater than or equal to 0.10 mm but less than or equal to 0.50 mm.

2. The multistrand cable according to claim 1, wherein, in each elementary strand, each of the diameters D1 and D2 is greater than or equal to 0.15 mm but less than or equal to 0.35 mm.

3. The multistrand cable according to claim 1, wherein, in each elementary strand, the pitch P1 is greater than or equal to 3 mm but less than the pitch P2, the pitch P2 being less than or equal to 20 mm (3 mm≤P1<P2≤20 mm).

4. The multistrand cable according to claim 3, wherein, in each elementary strand, the pitch P1 is greater than or equal to 3 mm but less than the pitch P2, the pitch P2 being less than or equal to 10 mm (3 mm≤P1<P2≤10 mm).

5. The multistrand cable according to claim 4, wherein, in each elementary strand, P2 is greater than or equal to 5 mm but less than or equal to 10 mm.

6. The multistrand cable according to claim 1, wherein P3 is greater than or equal to 7 mm but less than or equal to 25 mm.

7. The multistrand cable according to claim 6, wherein P3 is greater than or equal to 10 mm but less than or equal to 20 mm.

8. The multistrand cable according to claim 1, wherein, in each elementary strand, the ratio of the diameters D1 and D2 is greater than or equal to 0.5 but less than or equal to 1.5.

9. The multistrand cable according to claim 1, wherein, in each elementary strand, the ratio of the diameters D1 and D2 is greater than or equal to 0.7 but less than or equal to 1.3.

10. A tire comprising a cable according to claim 1.

11. The tire according to claim 10, wherein said multistrand cable is present in the belt of the tire.

* * * * *